United States Patent
Webster et al.

(10) Patent No.: US 11,384,642 B2
(45) Date of Patent: *Jul. 12, 2022

(54) TURBINE ENGINE AIRFOIL

(71) Applicant: GENERAL ELECTRIC COMPANY, Schenectady, NY (US)

(72) Inventors: Zachary Daniel Webster, Cincinnati, OH (US); Steven Robert Brassfield, Cincinnati, OH (US); Gregory Terrence Garay, West Chester, OH (US); Tingfan Pang, West Chester, OH (US); Daniel Endecott Osgood, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,936

(22) Filed: Jul. 15, 2020

(65) Prior Publication Data

US 2020/0347735 A1  Nov. 5, 2020

Related U.S. Application Data

(63) Continuation of application No. 16/223,808, filed on Dec. 18, 2018, now Pat. No. 10,767,492.

(51) Int. Cl.
*F01D 5/18* (2006.01)

(52) U.S. Cl.
CPC ........ *F01D 5/186* (2013.01); *F05D 2240/301* (2013.01); *F05D 2240/304* (2013.01); *F05D 2240/81* (2013.01); *F05D 2260/202* (2013.01)

(58) Field of Classification Search
None
See application file for complete search history.

(56) References Cited

U.S. PATENT DOCUMENTS

| | | | |
|---|---|---|---|
| 3,844,679 A | 10/1974 | Grondahl et al. |
| 4,142,824 A | 3/1979 | Anderson |
| 4,203,706 A | 5/1980 | Hess |
| 4,487,550 A | 12/1984 | Horvath et al. |
| 4,505,639 A | 3/1985 | Groess et al. |
| 4,669,957 A | 6/1987 | Phillips et al. |
| 4,672,727 A | 6/1987 | Field |
| 4,726,735 A | 2/1988 | Field et al. |
| 4,859,147 A | 8/1989 | Hall et al. |
| 5,223,320 A | 6/1993 | Richardson |
| 5,356,265 A | 10/1994 | Kercher |
| 5,383,766 A | 1/1995 | Przirembel et al. |

(Continued)

FOREIGN PATENT DOCUMENTS

| | | |
|---|---|---|
| CN | 1727642 A | 2/2006 |
| CN | 102802866 A | 11/2012 |

(Continued)

*Primary Examiner* — Michael Lebentritt
(74) *Attorney, Agent, or Firm* — McGarry Bair PC

(57) ABSTRACT

An airfoil for a turbine engine, comprising an outer wall defining an exterior surface bounding an interior and defining a pressure side and a suction side extending between a leading edge and a trailing edge to define a chord-wise direction and extending between a root and a tip to define a span-wise direction, outlets on the exterior surface, and a cooling air supply conduit within the interior and having a supply passage.

20 Claims, 11 Drawing Sheets

(56) References Cited

U.S. PATENT DOCUMENTS

| | | |
|---|---|---|
| 5,387,085 A | 2/1995 | Thomas, Jr. et al. |
| 5,392,515 A | 2/1995 | Auxier et al. |
| 5,405,242 A | 4/1995 | Auxier et al. |
| 5,486,093 A | 1/1996 | Auxier et al. |
| 5,503,529 A | 4/1996 | Anselmi et al. |
| 5,660,523 A | 8/1997 | Lee |
| 5,667,359 A | 9/1997 | Huber et al. |
| 5,702,232 A | 12/1997 | Moore |
| 5,720,431 A | 2/1998 | Sellers et al. |
| 5,931,638 A | 8/1999 | Krause et al. |
| 6,086,328 A | 7/2000 | Lee |
| 6,099,251 A | 8/2000 | LaFleur |
| 6,174,133 B1 | 1/2001 | Bunker |
| 6,174,134 B1 | 1/2001 | Lee et al. |
| 6,241,468 B1 | 6/2001 | Lock et al. |
| 6,254,334 B1 | 7/2001 | LaFleur |
| 6,287,075 B1 | 9/2001 | Kercher |
| 6,379,118 B2 | 4/2002 | Lutum et al. |
| 6,402,470 B1 | 6/2002 | Kvasnak et al. |
| 6,402,471 B1 | 6/2002 | Demers et al. |
| 6,478,537 B2 | 11/2002 | Junkin |
| 6,551,062 B2 | 1/2003 | Leeke et al. |
| 6,773,231 B2 | 8/2004 | Bunker et al. |
| 6,790,005 B2 | 9/2004 | Lee et al. |
| 6,832,889 B1 | 12/2004 | Lee et al. |
| 6,869,270 B2 | 3/2005 | Bunker et al. |
| 6,994,514 B2 | 2/2006 | Soechting et al. |
| 7,121,787 B2 | 10/2006 | Jacks et al. |
| 7,186,084 B2 | 3/2007 | Bunker et al. |
| 7,255,534 B2 | 8/2007 | Liang |
| 7,334,412 B2 | 2/2008 | Tiemann |
| 7,364,405 B2 | 4/2008 | Cunha et al. |
| 7,467,922 B2 | 12/2008 | Beeck et al. |
| 7,497,660 B2 | 3/2009 | Liang |
| 7,563,072 B1 | 7/2009 | Liang |
| 7,632,062 B2 | 12/2009 | Harvey et al. |
| 7,665,956 B2 | 2/2010 | Mitchell et al. |
| 7,686,580 B2 | 3/2010 | Cunha et al. |
| 7,686,582 B2 | 3/2010 | Cunha |
| 7,785,071 B1 | 8/2010 | Liang |
| 7,789,626 B1 | 9/2010 | Liang |
| 7,815,414 B2 | 10/2010 | Devore et al. |
| 7,887,294 B1 | 2/2011 | Liang |
| 8,043,058 B1 | 10/2011 | Liang |
| 8,057,182 B2 | 11/2011 | Brittingham et al. |
| 8,066,485 B1 | 11/2011 | Liang |
| 8,079,812 B2 | 12/2011 | Okita |
| 8,092,176 B2 | 1/2012 | Liang |
| 8,105,030 B2 | 1/2012 | Abdel-Messeh et al. |
| 8,109,726 B2 | 2/2012 | Liang |
| 8,172,534 B2 | 5/2012 | Ammann et al. |
| 8,262,357 B2 | 9/2012 | Mhetras |
| 8,313,287 B2 | 11/2012 | Little |
| 8,317,476 B1 | 11/2012 | Liang |
| 8,454,310 B1 | 6/2013 | Downs |
| 8,469,666 B1 | 6/2013 | Liang |
| 8,647,053 B2 | 2/2014 | Hsu et al. |
| 8,651,805 B2 | 2/2014 | Lacy et al. |
| 8,714,926 B2 | 5/2014 | Lee et al. |
| 8,840,363 B2 | 9/2014 | Lee |
| 8,851,848 B1 | 10/2014 | Liang |
| 8,864,469 B1 | 10/2014 | Liang |
| 9,133,715 B2 | 9/2015 | Lutjen et al. |
| 9,151,175 B2 | 10/2015 | Tham et al. |
| 9,234,438 B2 | 1/2016 | Lee |
| 9,249,670 B2 | 2/2016 | Bunker |
| 9,260,972 B2 | 2/2016 | Zelesky et al. |
| 9,273,561 B2 | 3/2016 | Lacy et al. |
| 9,279,330 B2 | 3/2016 | Xu et al. |
| 9,297,262 B2 | 3/2016 | Zhang et al. |
| 9,366,143 B2 | 6/2016 | Lee et al. |
| 9,394,796 B2 | 7/2016 | Lacy et al. |
| 9,447,692 B1 | 9/2016 | Liang |
| 9,470,095 B2 | 10/2016 | Propheter-Hinckley et al. |
| 9,605,545 B2 | 3/2017 | Grohens et al. |
| 9,630,277 B2 | 4/2017 | Lee et al. |
| 9,670,782 B2 | 6/2017 | Gohler et al. |
| 9,777,577 B2 | 10/2017 | Brandl et al. |
| 9,777,582 B2 | 10/2017 | Zelesky et al. |
| 9,840,927 B2 | 12/2017 | Tucker |
| 9,840,930 B2 | 12/2017 | Lee et al. |
| 9,856,739 B2 | 1/2018 | Bedrosyan et al. |
| 9,879,601 B2 | 1/2018 | Vandervaart et al. |
| 9,890,644 B2 | 2/2018 | Fran et al. |
| 9,896,942 B2 | 2/2018 | Shepherd |
| 9,896,954 B2 | 2/2018 | Walston et al. |
| 9,938,899 B2 | 4/2018 | Miranda et al. |
| 9,957,817 B2 | 5/2018 | Zelesky et al. |
| 9,982,541 B2 | 5/2018 | Kwon et al. |
| 10,352,177 B2 | 7/2019 | Bunker et al. |
| 10,724,391 B2 | 7/2020 | Flodman et al. |
| 10,767,492 B2* | 9/2020 | Webster ................ F01D 5/186 |
| 2005/0244264 A1 | 11/2005 | Jacks et al. |
| 2006/0002788 A1 | 1/2006 | Liang |
| 2008/0031738 A1 | 2/2008 | Lee |
| 2009/0169394 A1 | 7/2009 | Crow et al. |
| 2011/0262695 A1 | 10/2011 | Lee et al. |
| 2011/0293434 A1 | 12/2011 | Lee et al. |
| 2012/0070306 A1 | 3/2012 | Lee et al. |
| 2012/0201674 A1 | 8/2012 | Lee et al. |
| 2013/0294898 A1 | 11/2013 | Lee |
| 2014/0033736 A1 | 2/2014 | Propheter-Hinckley et al. |
| 2014/0286771 A1 | 9/2014 | Lacy |
| 2015/0086408 A1 | 3/2015 | Kittilingam et al. |
| 2015/0198050 A1 | 7/2015 | Lee et al. |
| 2015/0345298 A1 | 12/2015 | Mongillo et al. |
| 2015/0345304 A1 | 12/2015 | Mongillo et al. |
| 2016/0024937 A1 | 1/2016 | Xu |
| 2016/0076552 A1 | 3/2016 | Anderson et al. |
| 2016/0169003 A1 | 6/2016 | Wong et al. |
| 2016/0194964 A1 | 7/2016 | Vu et al. |
| 2016/0237828 A1 | 8/2016 | Burd |
| 2016/0362985 A1 | 12/2016 | Lacy et al. |
| 2016/0363054 A1 | 12/2016 | Miranda et al. |
| 2017/0007824 A1 | 1/2017 | Gardner et al. |
| 2017/0030198 A1 | 2/2017 | Kruckels et al. |
| 2017/0107826 A1 | 4/2017 | Krumanaker et al. |
| 2017/0138599 A1 | 5/2017 | Baibuzenko et al. |
| 2017/0234134 A1 | 8/2017 | Bunker |
| 2017/0298823 A1 | 10/2017 | Harding |
| 2017/0306746 A1 | 10/2017 | Konitzer et al. |
| 2017/0335691 A1 | 11/2017 | Crites et al. |
| 2018/0023415 A1 | 1/2018 | Simms et al. |
| 2018/0058226 A1 | 3/2018 | Tucker et al. |
| 2018/0094527 A1 | 4/2018 | Halfmann et al. |
| 2018/0128115 A1 | 5/2018 | Hudson et al. |
| 2018/0135423 A1 | 5/2018 | Dyson et al. |
| 2018/0156045 A1 | 6/2018 | Clum et al. |
| 2018/0171872 A1 | 6/2018 | Dyson et al. |
| 2018/0179956 A1 | 6/2018 | Wertz |
| 2018/0202296 A1 | 7/2018 | Kiener et al. |
| 2018/0230832 A1 | 8/2018 | Dierksmeier |
| 2018/0328188 A1 | 11/2018 | Marinelli et al. |
| 2018/0347372 A1 | 12/2018 | Lacy et al. |
| 2018/0363468 A1 | 12/2018 | Beyer et al. |
| 2019/0017389 A1 | 1/2019 | Rathay et al. |
| 2019/0071981 A1 | 3/2019 | Klein et al. |
| 2019/0153874 A1 | 5/2019 | Daehnert et al. |
| 2019/0186272 A1 | 6/2019 | Webster et al. |
| 2019/0226343 A1 | 7/2019 | LoRicco et al. |
| 2019/0257205 A1 | 8/2019 | Webster et al. |

FOREIGN PATENT DOCUMENTS

| | | |
|---|---|---|
| CN | 107084008 A | 8/2017 |
| CN | 108691571 A | 10/2018 |
| CN | 108868897 A | 11/2018 |
| EP | 3124745 A1 | 2/2017 |
| EP | 3124746 A1 | 2/2017 |
| JP | 2009221995 A | 10/2009 |
| WO | 2018093627 A3 | 5/2018 |

* cited by examiner

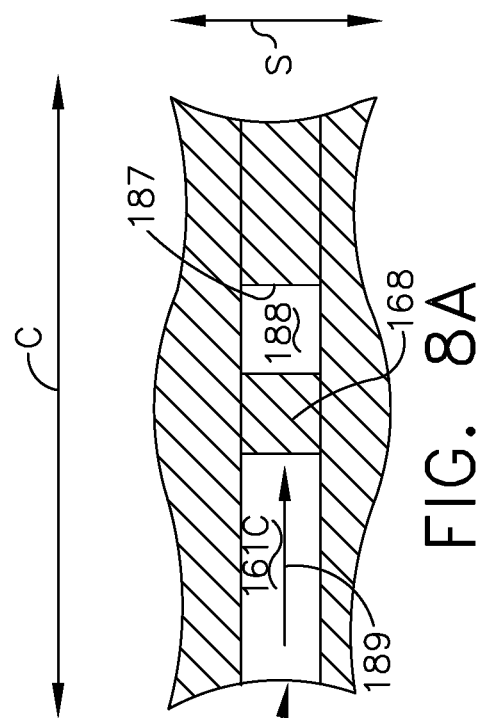
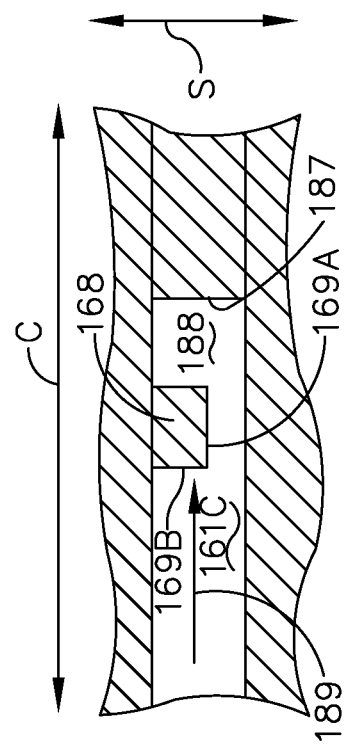
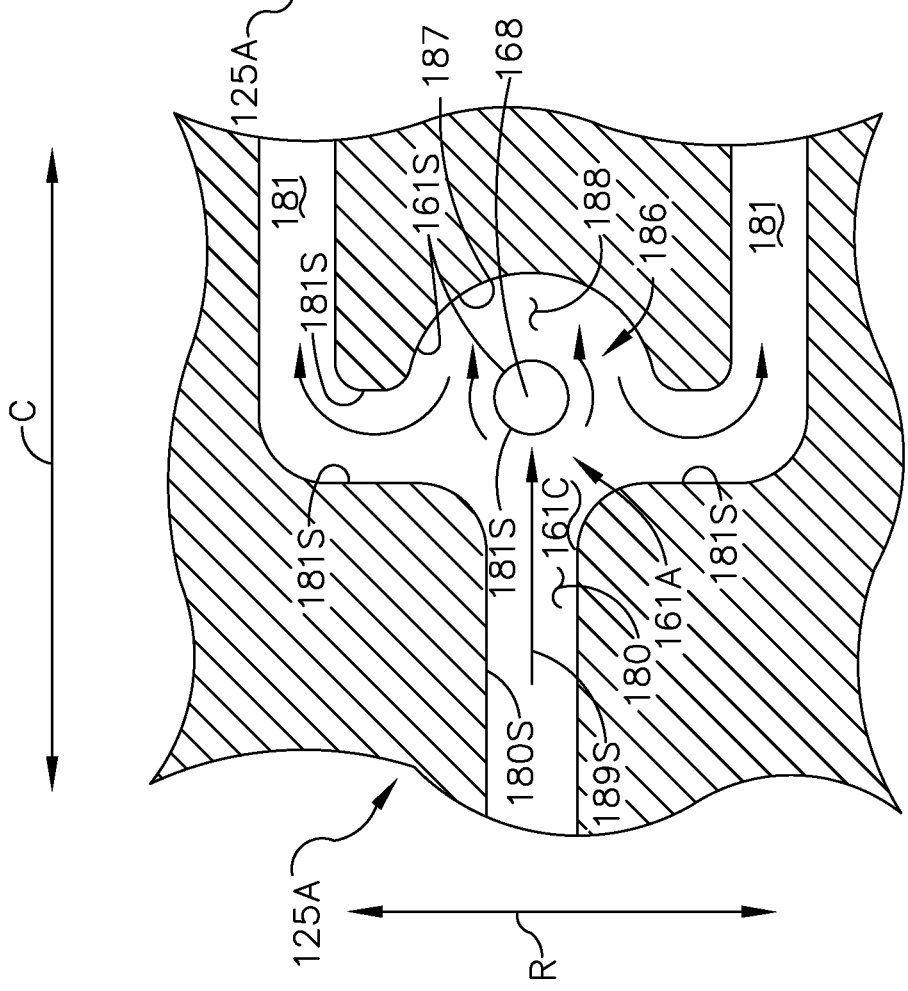

TURBINE ENGINE AIRFOIL

CROSS-REFERENCE TO RELATED APPLICATION(S)

This application is a continuation of U.S. application Ser. No. 16/223,808, filed Dec. 18, 2018, currently allowed, which is incorporated herein by reference in its entirety.

BACKGROUND

Turbine engines, and particularly gas or combustion turbine engines, are rotary engines that extract energy from a flow of pressurized combusted gases passing through the engine onto rotating turbine blades.

Turbine engines are often designed to operate at high temperatures to improve engine efficiency. It can be beneficial to provide cooling measures for engine components such as airfoils in the high-temperature environment, where such cooling measures can reduce material wear on these components and provide for increased structural stability during engine operation.

BRIEF DESCRIPTION

In one aspect, the disclosure relates to an airfoil for a turbine engine, including an outer wall defining an exterior surface bounding an interior and defining a pressure side and a suction side extending between a leading edge and a trailing edge to define a chord-wise direction and extending between a root and a tip to define a span-wise direction, outlets on the exterior surface, and a cooling air supply conduit within the interior and having a supply passage and a three-dimensional plexus of fluidly interconnected cooling passages that are fluidly connected to the outlets, wherein at least a portion of the three-dimensional plexus is spaced from the outer wall.

In another aspect, the disclosure relates to a cooled component for a turbine engine, including an outer wall defining an exterior surface bounding an interior, outlets on the exterior surface, and a cooling air supply conduit having a supply passage and a three-dimensional plexus of fluidly interconnected cooling passages which are fluidly connected to the outlets, with the supply passage at least partially radially aligned with the three-dimensional plexus.

In yet another aspect, the disclosure relates to a cooled component, including an outer wall defining an exterior surface bounding an interior, and a three-dimensional plexus of fluidly interconnected cooling passages located within the interior and having at least one planar set of cooling passages.

BRIEF DESCRIPTION OF THE DRAWINGS

In the drawings:

FIG. 7 is a side cross-sectional view of another cooling passage in the airfoil of FIG. 2 including another airflow modifier.

FIG. 8A is a top cross-sectional view of the cooling passage and airflow modifier of FIG. 7 in a first configuration.

FIG. 8B is a top cross-sectional view of the cooling passage and airflow modifier of FIG. 7 in a second configuration.

DETAILED DESCRIPTION

Figure 1:
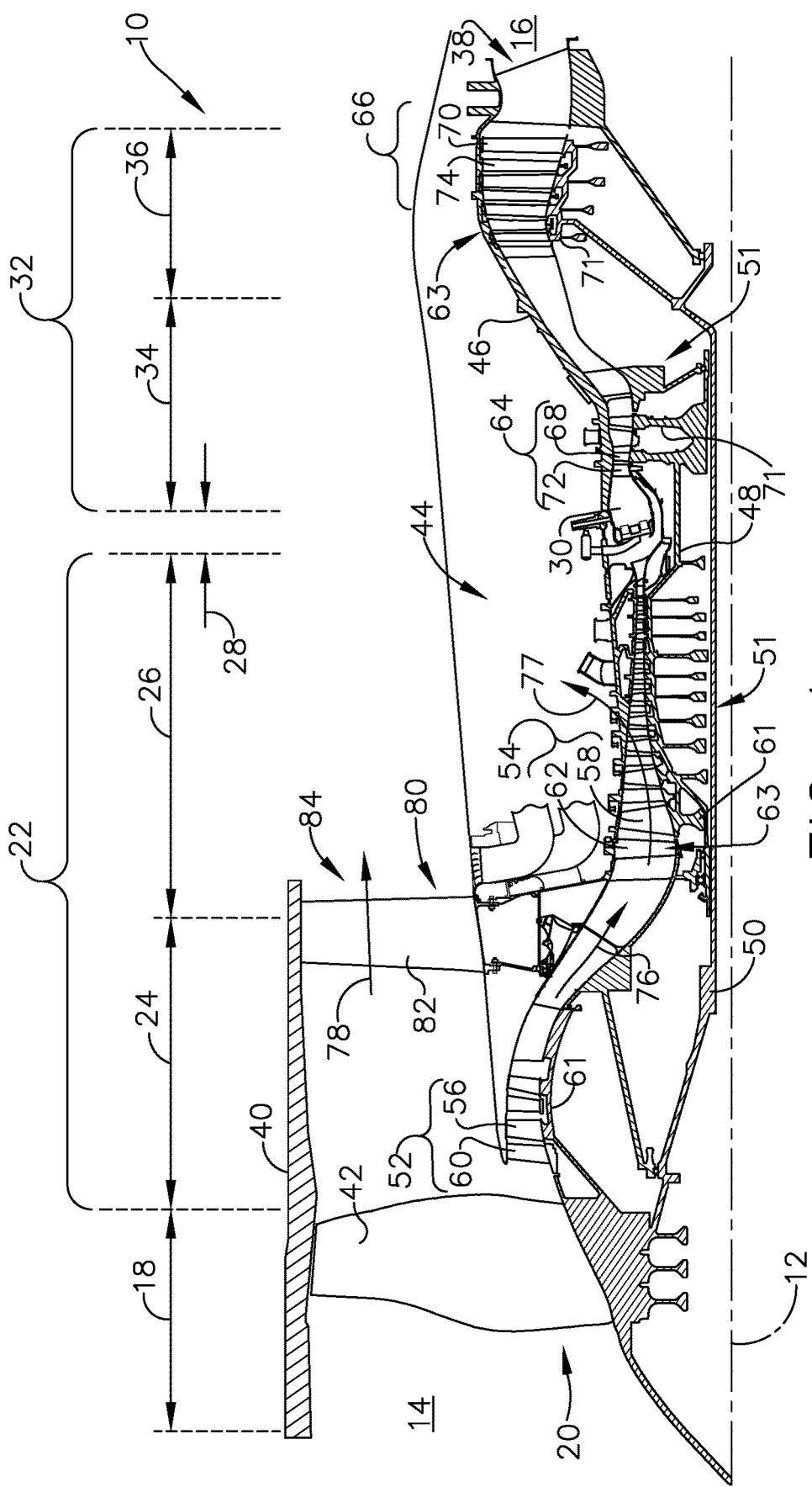
FIG. 1 is a schematic cross-sectional diagram of a turbine engine for an aircraft.

Aspects of the present disclosure are directed to a cooled component. For the purposes of description, the cooled component will be described as a cooled turbine engine component, such as a cooled airfoil. It will be understood that the disclosure may have general applicability for any engine component, including turbines and compressors and non-airfoil engine components, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

As used herein, "a set" can include any number of the respectively described elements, including only one element. Additionally, the terms "radial" or "radially" as used herein refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to (or integral to) a disk 61, which is mounted to the corresponding one of the HP and LP spools 48, 50. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12 while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
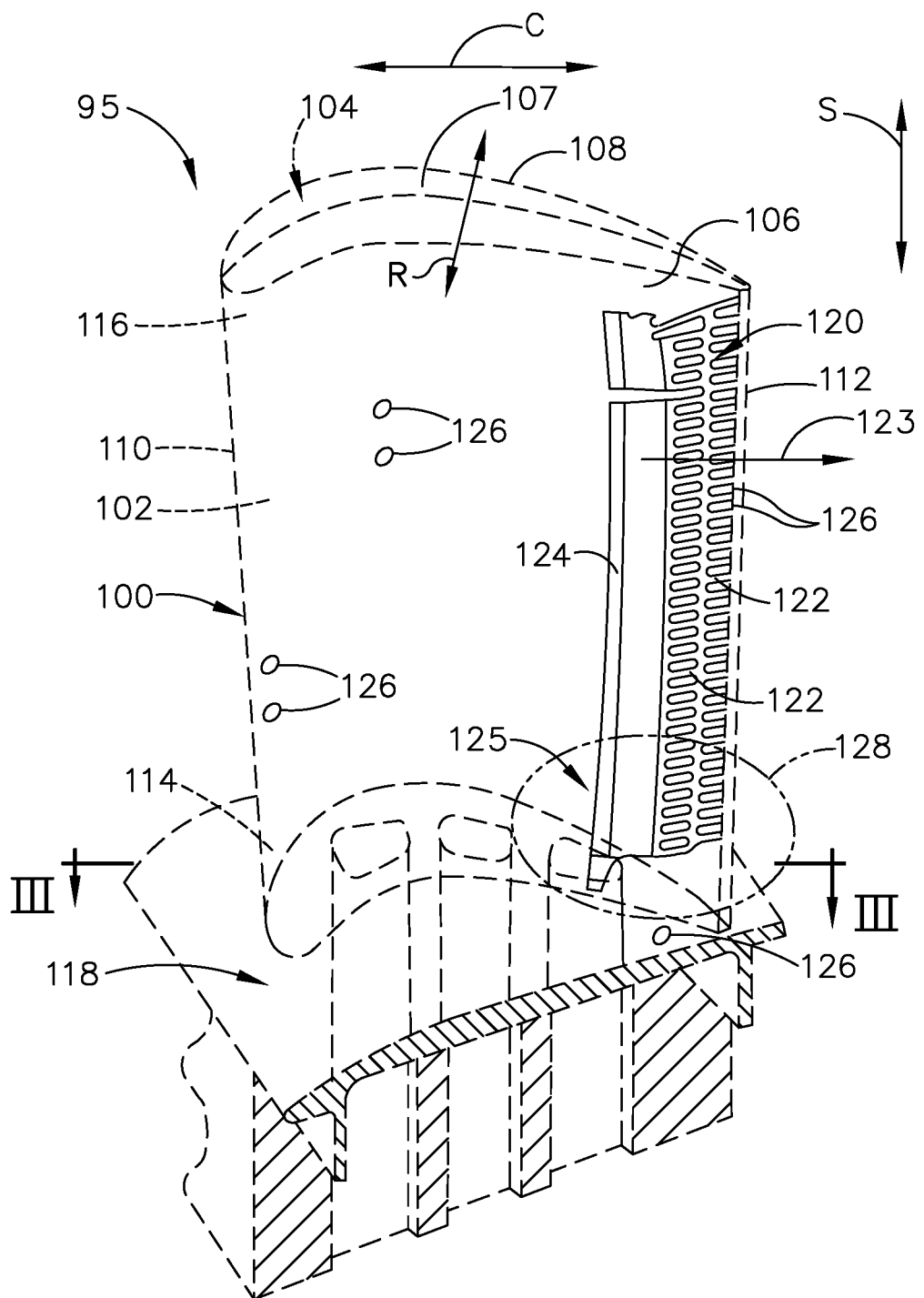
FIG. 2 is a perspective view of a component that can be utilized in the turbine engine of FIG. 1 in the form of an airfoil including a plexus of cooling passages according to various aspects described herein.

Referring now to FIG. 2, a cooled component in the form of an airfoil assembly 95 is shown that can be utilized in the turbine engine 10 of FIG. 1. The airfoil assembly 95 includes an airfoil 100 that can be any airfoil such as a blade or vane in the fan section 18, compressor section 22 or turbine section 32 as desired. It will be understood that the cooled component can also be in the form of any suitable component within the turbine engine, including a shroud, hanger, strut, platform, inner band, or outer band, in non-limiting examples.

The airfoil 100 includes an outer wall 102 (shown in phantom line) defining an exterior surface 103 and bounding an interior 104. The outer wall 102 defines a pressure side 106 and a suction side 108, and a cross-wise direction R can be defined therebetween. The outer wall 102 also extends axially between a leading edge 110 and a trailing edge 112 to define a chord-wise direction C, and also extends radially between a root 114 and a tip 116 to define a span-wise direction S.

The airfoil assembly 95 can also include a platform 118 (shown in phantom line) coupled to the airfoil 100 at the root 114. In one example the airfoil 100 is in the form of a blade, such as the HP turbine blade 68 of FIG. 1, extending from a dovetail 117 (in phantom line). In such a case, the platform 118 can form at least a portion of the dovetail 117. In another example, the airfoil 100 can be in the form of a vane, such as the LP turbine vane 72, and the platform 118 can form at least a portion of an inner band or an outer band (not shown) coupled to the root 114.

The dovetail 117 can be configured to mount to the turbine rotor disk 71 on the engine 10. The dovetail 117 can comprise at least one inlet passage 119, exemplarily shown as three inlet passages 119, each extending through the dovetail 117 to provide internal fluid communication with the airfoil 100. It should be appreciated that the dovetail 117 is shown in cross-section, such that the inlet passages 119 are housed within the body of the dovetail 117.

The airfoil 100 further includes at least one cooling air supply conduit 125 (also referred to herein as a "conduit 125"). The conduit 125 includes at least one three-dimensional plexus 120 (also referred to herein as "plexus 120") of fluidly interconnected cooling passages 122. The plexus 120 is illustrated schematically in solid line with "flat" passages and regions. It should be understood that the plexus 120 represents three-dimensional open spaces or voids inside of the airfoil 100. The plexus 120 can extend between at least one inlet 124 fluidly coupled to a source of cooling air within the airfoil interior 104, such as the at least one inlet passage 119, and at least one outlet 126 fluidly coupled to the plexus 120. The outlets 126 can be located at any or all of the leading edge 110, trailing edge 112, root 114, tip 116, or platform 118. The inlet 124 can include a slot, hole, or combination as desired. It is contemplated that the inlet 124 can receive cooling fluid from any desired location within the airfoil assembly 95, such as an interior passage of the platform 118, or a central supply passage (not shown) within the airfoil interior 104. In addition, while the plexus 120 is illustrated proximate the trailing edge 112 of the airfoil 100, the plexus 120 can extend to any portion of the airfoil 100 including the leading edge 110, root 114, tip 116, or elsewhere along the pressure side 106 or suction side 108. Multiple plexuses can also be provided within the airfoil 100.

It is contemplated that the cooling passages 122 of the plexus 120 can furcate, including recursively furcating, at least twice in the downstream direction indicated by the arrow 123. For example, the recursively-furcated plexus 120 can define a fractal pattern. In addition, the conduit 125 can further include a non-furcated passage or non-furcated portion 121 upstream of the plexus 120. In the illustrated example, a plurality of outlets 126 are located on the exterior surface 103 extending along the trailing edge 112. The outlets 126 can be located along the leading edge 110, trailing edge 112, pressure side 106, or suction side 108. The outlets 126 can also be fluidly coupled to the plexus 120. It should be understood that the outlets 126 can include in-line diffusers, diffusing slots, film holes, ejection holes, channels, and the like, or combinations thereof. The outlets 126 can be located at any suitable location including the leading edge 110, root 114, tip 116, or elsewhere along the pressure side 106 or suction side 108. Outlets 126 can also be formed in other portions of the airfoil assembly 95, such as the platform 118, and fluidly coupled to the plexus 120.

The three-dimensional plexus 120 of cooling passages 122 can be formed using a variety of methods, including additive manufacturing, casting, electroforming, or direct metal laser melting, in non-limiting examples. It is contemplated that the airfoil 100 having the plexus 120 can be an additively manufactured component. As used herein, an "additively manufactured" component will refer to a component formed by an additive manufacturing (AM) process, wherein the component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination. In addition, the plexus 120 can include any desired geometric profile, including a fractal geometric profile, an axial serpentine profile, or a radial serpentine profile.

Figure 3:
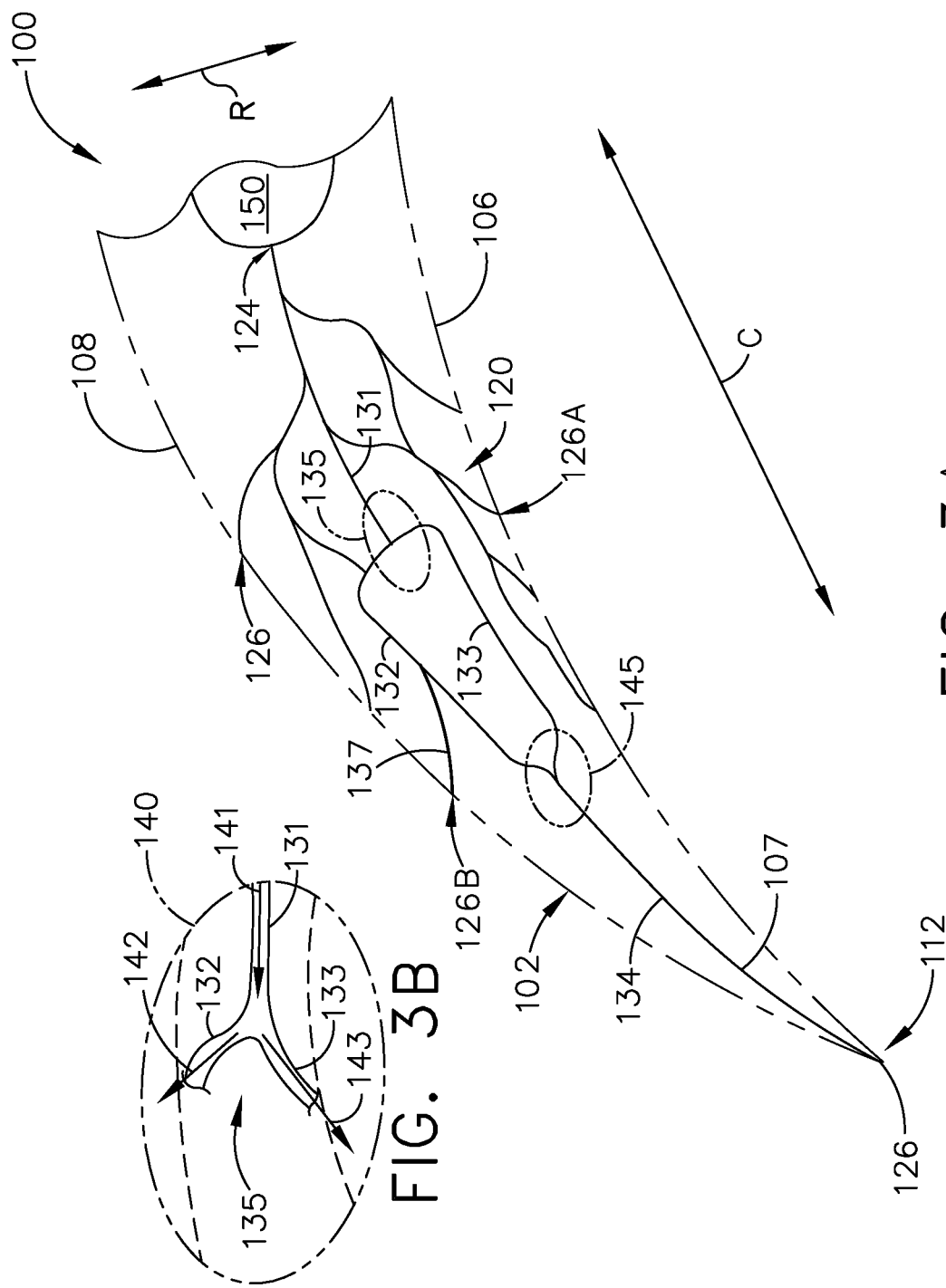
FIG. 3A is a cross-sectional view of the airfoil of FIG. 2 along line illustrating an intersection in the plexus.
FIG. 3B is a schematic view of the intersection of FIG. 3A.

FIG. 3A illustrates the airfoil 100 in cross-section with the plexus 120 being shown in further detail. It is contemplated that the plexus 120 can extend in the span-wise direction S (as seen in FIG. 2), and can also extend in the chord-wise direction C as well as the cross-wise direction R. For example, the plexus 120 can have an overall profile or form similar to that of a vein plexus or network in a body. The plexus 120 can include an in-wall cooling passage extending through the outer wall 102, a near-wall cooling passage, or other cooling structures suitable for the airfoil 100. With reference to FIGS. 2 and 3A, it should be understood that each line notated as a cooling passage 122 in FIG. 3A represents a plurality of cooling passages 122 "stacked" in a radially inward or outward manner as seen in FIG. 2.

The plexus 120 can include multiple intersections between the fluidly interconnected cooling passages 122. It should also be understood that in other cross-sectional views through the airfoil 100 radially inward or outward from the line the plexus 120 can have other appearances, branches, or intersections. It can be appreciated that the three-dimensional plexus 120 having multiple interconnected cooling passages 122 can be utilized for a tailored supply of cooling air to a variety of locations within the interior or exterior of the airfoil 100.

In the illustrated example, the airfoil 100 includes a first planar set 131, a second planar set 132, and a third planar set 133 of cooling passages 122. As used herein, a "planar set" of cooling passages can refer to any set of cooling passages that extends or branches in two dimensions that define a plane. In another example, a "planar set" of cooling passages can refer to any set of cooling passages that forms a three-dimensional structure that extends in two dimensions and includes a thickness in a third dimension. In still another example, a "planar set" of cooling passages can refer to any set of cooling passages having a first local region extending in two dimensions that define a first plane, and having a second local region that extending in two dimensions that define a second plane different from the first plane, such as an S-shaped planar set of cooling passages in one example. Put another way, "planar" as used herein can refer to a structure that is locally "flat" or two-dimensional over a given region but can include an overall curvature, such as a curved plane, including a curved plane structure with a three-dimensional thickness. The planar sets of cooling passage can include tip-wise-oriented passages, chord-wise-oriented passages, or span-wise-oriented passages, or any combination thereof.

The first, second, and third planar sets 131, 132, 133 are illustrated as being fluidly coupled to one another at a first intersection 135. In addition, a first set of outlets 126A can fluidly couple to the first planar set 131, and a second set of outlets 126B can fluidly couple to the second planar set 132 as shown. The airfoil 100 can also include an in-wall cooling passage 137 extending through the outer wall 102, as shown at the suction side 108. The in-wall cooling passage 137 can fluidly couple the second planar set 132 to the second set of outlets 126B. It is contemplated that the in-wall cooling passage 137 can be a non-furcating cooling passage. It should also be understood that the airfoil 100 can include other in-wall cooling passages (not shown) fluidly coupled to the plexus 120.

In addition, a second intersection 145 illustrates that the second and third planar sets 132, 133 can fluidly couple to a fourth planar set 134 of cooling passages 122. The fourth planar set 134 is illustrated along a plane partially extending along the camber line 107 of the airfoil 100, and it is also contemplated that the fourth set 134 can be formed in any direction.

A source 150 of cooling air can be positioned within the airfoil 100. The source 150 is illustrated as a radial cooling passage, and it should be understood that the source 150 of cooling air can have a variety of orientations or shapes, and can be positioned within the airfoil 100 or elsewhere in the airfoil assembly 95 including the platform 118 as desired. The plexus 120 can fluidly couple to the source 150 of cooling air via the at least one inlet 124 as shown.

FIG. 3B illustrates a zoomed view 140 of the plexus 120 with the first intersection 135 of the first, second, and third planar sets 131, 132, 133 of cooling passages 122. The first planar set 131 can extend along a first plane 141, which is seen in an edge-on view. The second planar set 132 can extend along a second plane 142 (seen edge-on) different from the first plane 141, and the third planar set 133 extends along a third plane 143 (seen edge-on) unaligned with the first and second planes 141, 142. In the illustrated example, the first plane 141 partially extends toward the chord-wise direction C, the second plane 142 partially extends in the cross-wise direction R toward the suction side 108, and the third plane 143 partially extends in the cross-wise direction R toward the pressure side 106.

Figure 4:
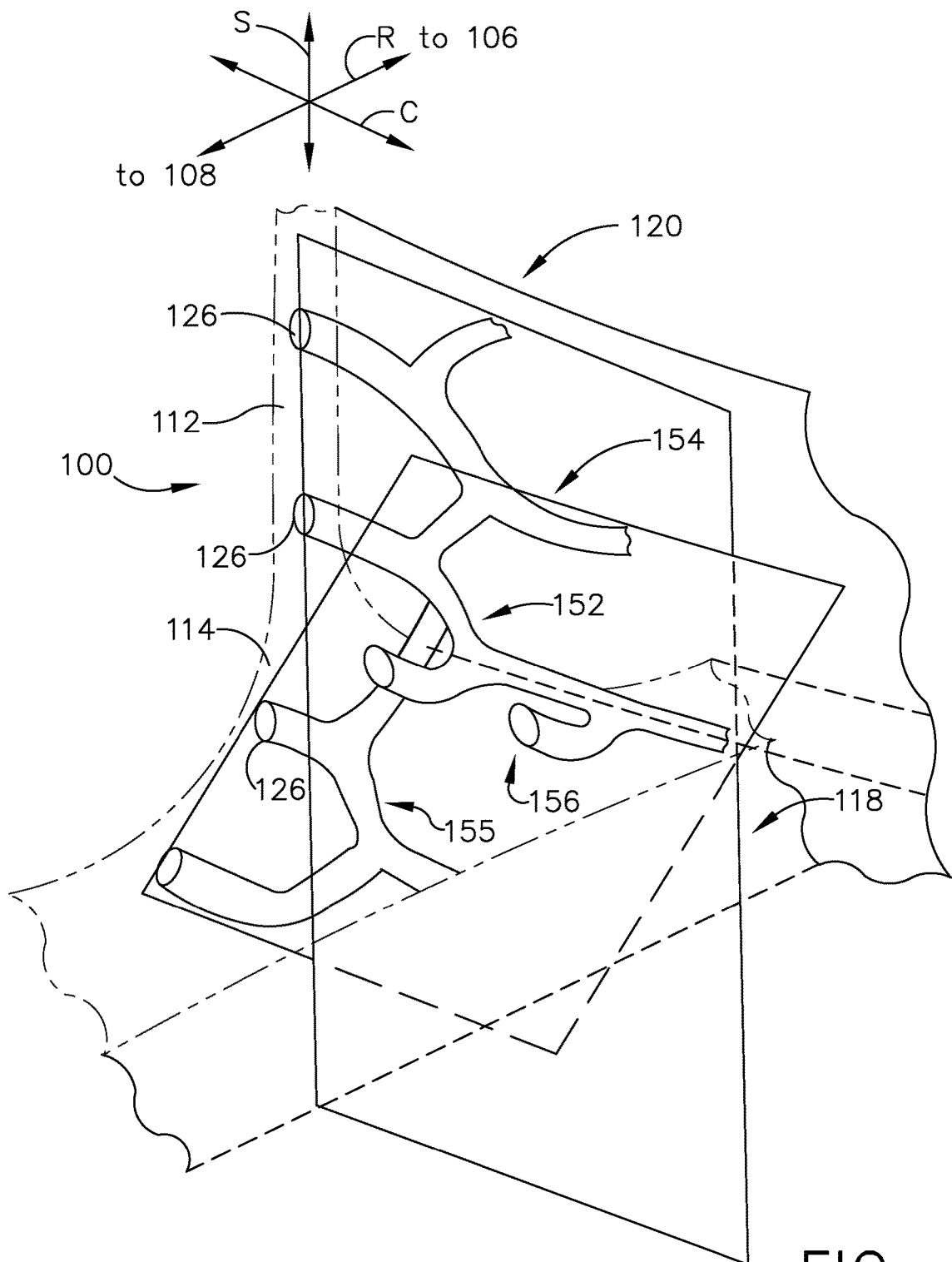
FIG. 4 is a perspective view of a portion of the airfoil of FIG. 2 illustrating another intersection in the plexus.

Referring now to FIG. 4, a portion 128 (FIG. 2) of the plexus 120 of cooling passages is shown along the trailing edge 112 and platform 118, where the third intersection 152 is located at the root 114 of the airfoil 100. The span-wise direction S and the chord-wise direction C are shown, as well as directions toward the pressure side 106 and suction side 108. It should be understood that in the illustrated example wherein the airfoil 100 comprises a blade, the root 114 is adjacent the platform 118 coupled to the blade. In an alternate example wherein the airfoil 100 comprises a vane, the root 114 can be adjacent an inner or outer band (not shown) coupled to the vane.

In the illustrated example, a third intersection 152 fluidly couples a fourth planar set 154 of cooling passages along the span-wise direction S to a fifth planar set 155 and a sixth planar set 156 of cooling passages. The fifth planar set 155 defines a fifth plane 157 and branches from the third intersection 152 toward the suction side 108 and platform 118. The sixth planar set 156 defines a sixth plane 158 and branches from the third intersection 152 toward the pressure side 106 and platform 118. Arrows illustrate cooling air flowing through the plexus 120 and exiting via the outlets 126. Some of the outlets 126 can be located along the trailing edge 112, and some of the outlets 126 can also be located within the platform 118. In this manner, the three-dimensional plexus 120 of fluidly interconnected cooling passages 122 can extend in first, second, and third directions, such as the span-wise direction S, the chord-wise direction C, and the cross-wise direction R.

Figure 5:
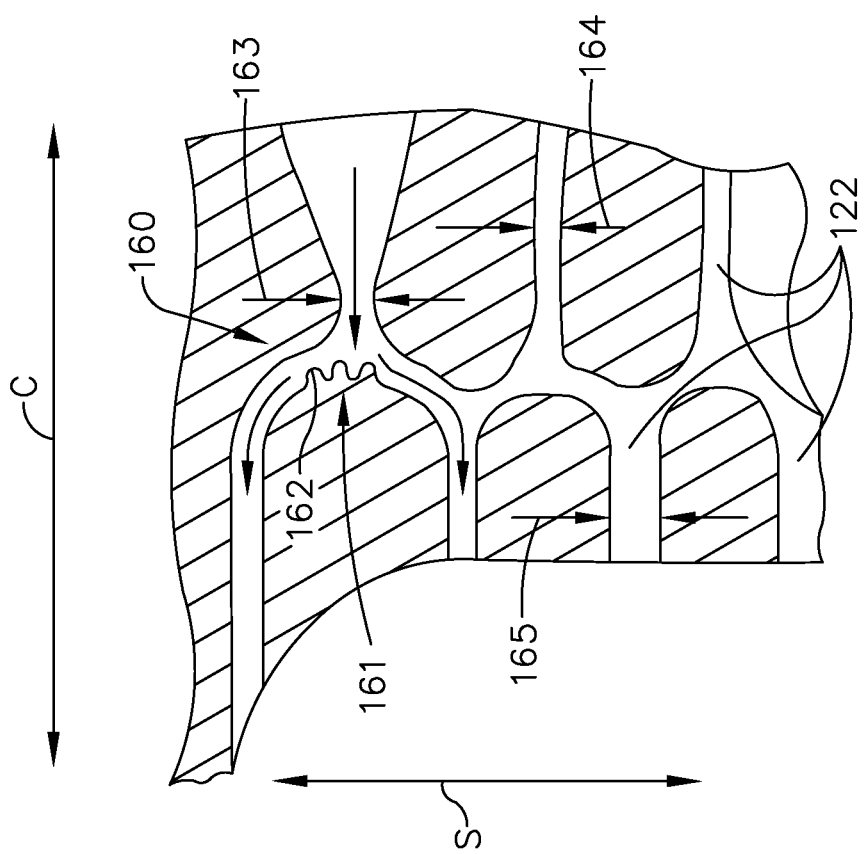
FIG. 5 is a side cross-sectional view of a cooling passage in the airfoil of FIG. 2 including an airflow modifier.

Turning to FIG. 5, an exemplary sectional view of the airfoil 100 is shown with the span-wise and chord-wise directions S, C illustrated. It is further contemplated that an airflow modifier 160 can be included within at least one cooling passage 122 of the plexus 120. The airflow modifier 160 can be configured to redirect, speed up, slow down, turbulate, mix, or smooth an airflow (illustrated with arrows) within the at least one cooling passage 122. One exemplary airflow modifier 160 can include a turbulator. As used herein, a "turbulator" will refer to any component that can generate a turbulent airflow, including dimples, pins, or impingement zones, in non-limiting examples. Other non-limiting examples of airflow modifiers 160 that can be utilized include surface roughness, variable passage width, or scalloped wall portions.

In one example, the airflow modifier 160 includes an impingement zone 161 in combination with surface roughness 162 at an intersection between fluidly coupled cooling passages 122. Another airflow modifier 160 can be in the form of a narrowed portion 163 of a cooling passage 122; it can be appreciated that such narrowing of a cooling passage 122 can cause an airflow to increase in speed through the portion 163. In still another example, the airflow modifier 160 can include a first width 164 in one cooling passage 122, and a second width 165 larger than the first width 164 in another cooling passage 122.

Figure 6:
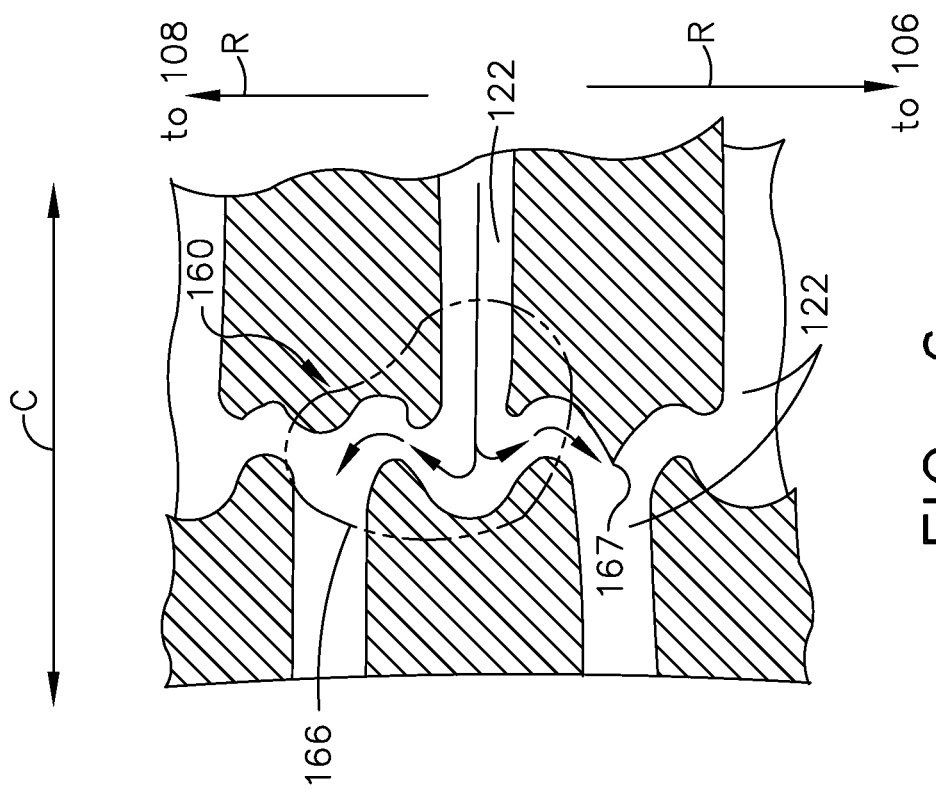
FIG. 6 is a side cross-sectional view of another cooling passage in the airfoil of FIG. 2 including another airflow modifier.

FIG. 6 illustrates another exemplary sectional view of the airfoil 100, with the chord-wise direction C and cross-wise direction R shown. It should be understood that the sectional view of FIG. 6 is in a direction perpendicular to that of FIG. 5.

The airflow modifier 160 can further include a scalloped portion 166, where adjacent concave and convex surfaces can cause swirling or turbulence of a local airflow through the cooling passage 122. In still another example, the airflow modifier 160 can also include a beveled portion 167 with a sharp corner.

Turning to FIG. 7, a top cross-sectional view of another cooling conduit 125A within the airfoil 100 is shown. The cooling conduit 125A also includes an impingement zone 161A with an impingement chamber 161C having at least one inlet passage 180 and at least one outlet passage 181 which is illustrated as being furcated into two outlet passages 181. A common junction 186 can be defined at an intersection of the inlet passage 180 and outlet passages 181. The cooling conduit 125A can, in a non-limiting example, form part of the plexus 120 wherein the inlet passage 180 and outlet passages 180 can form cooling passages 122 within the plexus 120.

A turbulator 168 can be positioned within the impingement chamber 161C at the common junction 186. The turbulator 168 can be positioned along a center streamline direction 189 of the inlet passage 180 as shown. For example, the turbulator 168 can be spaced from a rear wall 187 of the impingement chamber 161C to define a rear portion 188 of the impingement chamber 161C.

The turbulator 168 is illustrated as a pin in the example of FIG. 7. It should be understood that the turbulator 168 can have any suitable geometry or form, including a cylindrical pin, a flattened fin, a fin, an airfoil, a chevron, or an irregular geometric profile. The turbulator 168 can also define a surface area 168S and first and second surfaces 169A, 169B. The impingement chamber 161C can also define a chamber surface area 161S that includes the surface area 168S. In addition, the inlet passage 180 can define an inlet surface area 180S. It is contemplated that the chamber surface area 161S can be greater than the inlet surface area 180S. For example, a surface area of the cooling conduit 125A can increase when moving in the center streamline direction 189, e.g. when moving from the inlet passage 180 to the impingement chamber 161C. In another example, the chamber surface area 161S can be greater than the inlet surface area 180S or an outlet surface area 181S defined by the at least one outlet passage 181.

It is further contemplated that at least one of the turbulator 168 or the impingement chamber 161C can form an airflow modifier 160 within the cooling conduit 125A. Optionally, other airflow modifiers such as a turbulator, scalloped portion, narrowed portion, surface roughness, or beveled portion described above can also be included in the cooling conduit 125A.

FIG. 8A illustrates a first configuration of the cooling conduit 125A in a view perpendicular to that of FIG. 7. In the illustrated example, the turbulator 168 extends fully across the extent of the impingement chamber 161C in a direction unaligned with, e.g. perpendicular to, the center streamline direction 189. Cooling air flowing through the cooling conduit 125A in this configuration can impinge the turbulator 168, generate a turbulent airflow along the rear wall 187, and transfer heat through the turbulator 168 to multiple walls of the impingement chamber 161C to provide cooling.

FIG. 8B illustrates a second configuration of the cooling conduit 125A in a view perpendicular to that of FIG. 7. In the illustrated example, the turbulator 168 can extend partially across the impingement chamber 161C in a direction unaligned with, e.g. perpendicular to, the center streamline direction 189 as shown. Cooling air flowing through the cooling conduit 125A in this configuration can impinge the turbulator 168 as well as flow multiple surfaces such as the first and second surfaces 169A, 169B of the turbulator 168, thereby transferring heat through the turbulator 168 to one wall of the impingement chamber 161C.

In operation, air flowing through the cooling conduit 125, 125A, including the plexus 120 and cooling passage 122, can encounter or impinge the airflow modifier 160. The airflow modifier 160 can causing swirling or other turbulence of a local airflow, such as the scalloped portion 166 or impingement zones 161, 161A with surface roughness 162 or impingement chamber 161C. The airflow modifier 160 can also be utilized to redirect a local airflow, such as via the beveled portion 167 or rear portion 188 of the impingement chamber 161C. The airflow modifier 160 can also alter a local airflow speed such as via the narrowed portion 163. It can also be appreciated that any of the exemplary airflow modifiers can modify one or more airflow characteristics such as speed, velocity, swirl, or turbulence, and that a given airflow modifier may also modify multiple airflow characteristics within the cooling conduit or passage.

It will be understood that aspects of the airflow modifiers 160 described above can be combined or tailored to any desired portion of the three-dimensional plexus 120, as well as in any desired direction within the airfoil 100. The airflow modifiers 160 can be oriented to direct or modify airflows moving in the span-wise direction S, chord-wise direction C, cross-wise direction R, or any combination thereof, including in cooling passages not having a three-dimensional plexus. In one non-limiting example, the impingement chamber 161C can be located within a portion of the plexus 120 forming a near-wall cooling structure, such as in a portion of the plexus 120 located adjacent the pressure side 106 or suction side 108 as shown in the view of FIG. 3A.

Figure 9:
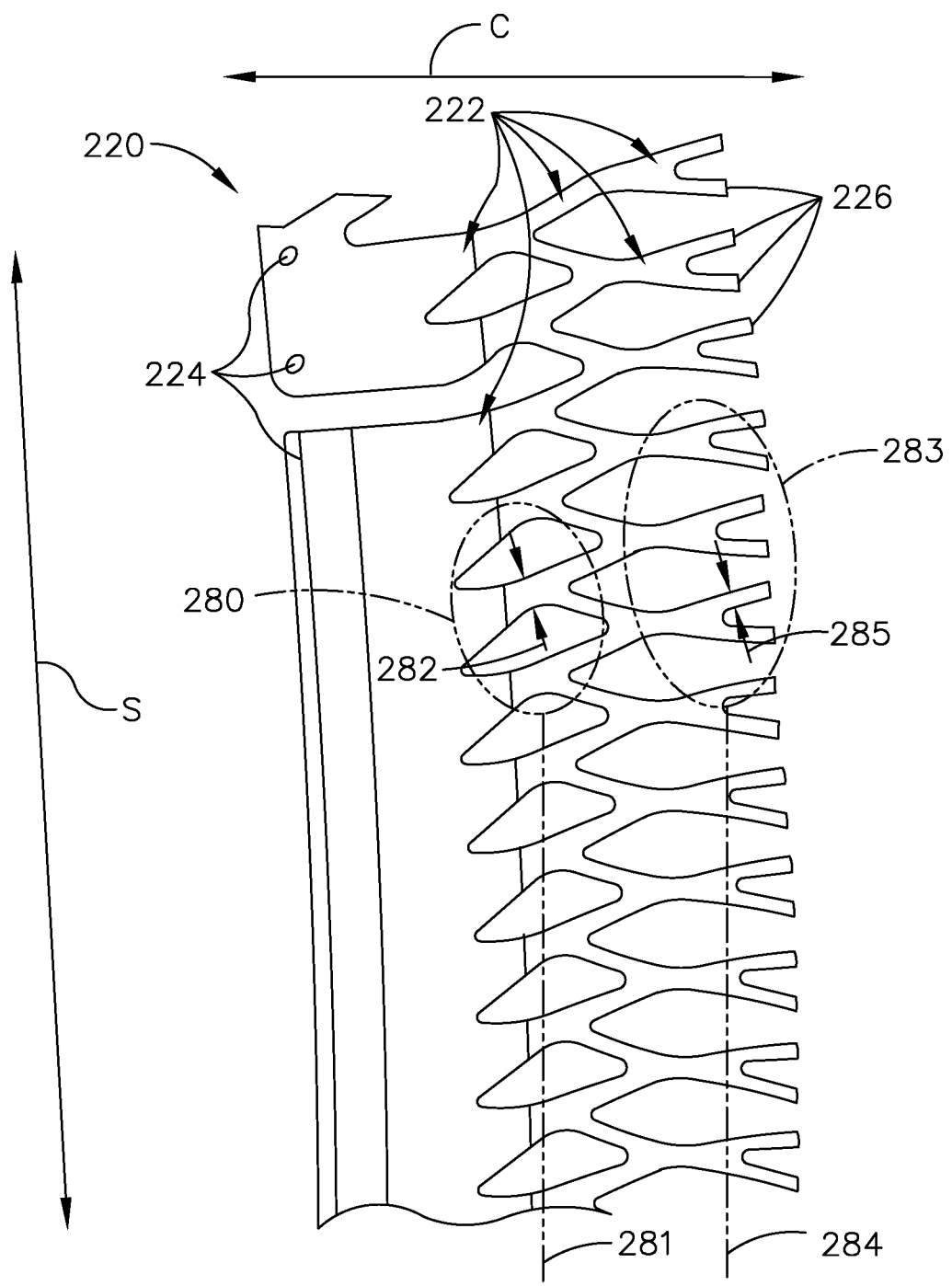
FIG. 9 is a sectional view of another plexus of cooling passages that can be utilized in the airfoil of FIG. 2.

Referring now to FIG. 9, another three-dimensional plexus 220 of cooling passages is illustrated that can be utilized in the airfoil 100. The plexus 220 is similar to the plexus 120; therefore, like parts will be identified with like numerals increased by 100, with it being understood that the description of the like parts of the plexus 120 applies to the plexus 220, unless otherwise noted.

For clarity, the plexus 220 is shown without the surrounding airfoil. It should be understood that the plexus 220 can be positioned within an interior of the airfoil, such as that shown for the plexus 120 within the airfoil 100 (see FIG. 2). In addition, it should be understood that although illustrated with "flat" passages and regions, the plexus 220 represents three-dimensional open spaces or voids within the airfoil 100. The span-wise and chord-wise directions S, C are illustrated for reference. It should be understood that the plexus 220 can be oriented in any suitable direction within the airfoil 100, including along any combination of the span-wise direction S, chord-wise direction C, or cross-wise direction R.

The plexus 220 of cooling passages 222 can include at least one inlet 224 wherein cooling air can be supplied to the plexus 220. The inlet 224 is illustrated with a combination of a slot and inlet holes. The plexus 220 also includes a plurality of outlets 226 that can be positioned along a trailing edge of the airfoil.

The plexus 220 can include a fractal geometric profile. As used herein, "fractal" will refer to a recursive or self-similar pattern or arrangement of cooling passages. More specifically, a first group 280 of linear cooling passages 222 along a first chord-wise position 281 can have a first passage size 282. A second group 283 of linear cooling passages 222 along a second chord-wise position 284 downstream of the first chord-wise position 281, have a second passage size 285 that can be smaller than the first passage size 282. It is contemplated that a passage size of the linear cooling passages 222, or of groups of linear cooling passages 222, can decrease between the first chord-wise position 281 and the second chord-wise position 284. Further, it can be appreciated that the second group 283 has a similar appearance or pattern to the first group 280 on a differing size scale. It should be understood that the plexus 220 can also extend in a direction between a pressure and suction side of the airfoil, including groups of linear cooling passages having variable passage sizes as desired. In this manner, the plexus 220 can continually recursively furcate in a downstream direction until fluidly connecting to the outlets 226 and can also define a fractal pattern as described above. The plexus 220 can also include a non-expanding cross section that is at least one of constant or reducing in the flow direction, such as the second passage size 285 being smaller than the first passage size 282.

Figure 10:
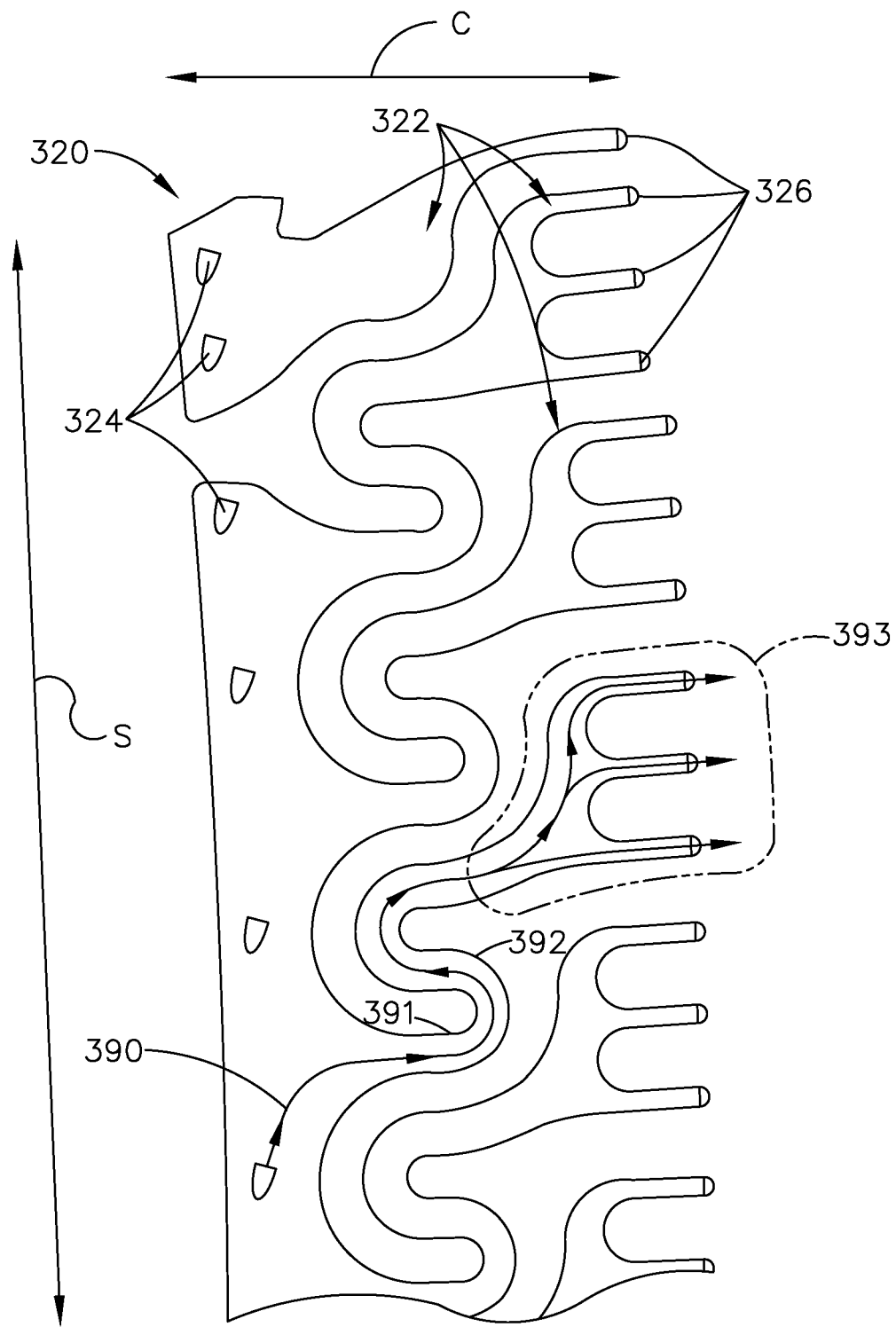
FIG. 10 is a sectional view of another plexus of cooling passages that can be utilized in the airfoil of FIG. 2.

Referring now to FIG. 10, another plexus 320 of cooling passages is illustrated that can be utilized in the airfoil 100. The plexus 320 is similar to the plexus 120, 220; therefore, like parts will be identified with like numerals further increased by 100, with it being understood that the description of the like parts of the plexus 120, 220 applies to the plexus 320, unless otherwise noted.

For clarity, the plexus 320 is shown without the surrounding airfoil. It should be understood that the plexus 320 can be positioned within an interior of the airfoil, such as that shown for the plexus 120 within the airfoil 100 (see FIG. 2). In addition, it should be understood that although illustrated with "flat" passages and regions, the plexus 320 represents three-dimensional open spaces or voids within the airfoil 100. The span-wise and chord-wise directions S, C are illustrated for reference. It should be understood that the plexus 320 can be oriented in any suitable direction within the airfoil 100, including along any combination of the span-wise direction S, chord-wise direction C, or cross-wise direction R.

The plexus 320 of cooling passages 322 can include at least one inlet 324, illustrated as a plurality of inlet holes, wherein cooling air can be supplied to the plexus 320. The plexus 320 also includes a plurality of outlets 326 that can be positioned along a trailing edge of the airfoil.

A cooling passage 322 is shown with an exemplary cooling airflow 390 flowing between the inlet 324 and outlet 326. One difference is the plexus 320 can include a radial serpentine profile. More specifically, the cooling passage 322 can include a first portion 391 wherein the cooling airflow 390 moves in a downstream chord-wise direction, as well as a second portion 392 offset in the span-wise direction (e.g. radially offset) from the first portion 391 wherein the cooling airflow 390 moves in an upstream chord-wise direction as shown. The cooling passage 322 can further include a third portion 393 wherein the cooling airflow 390 moves in a downstream chord-wise direction and furcates, splits, or divides prior to flowing through multiple outlets 326. In this manner, the first portion 391, second portion 392, and third portion 393 can at least partially define the radial serpentine profile of the plexus 320.

Figure 11:
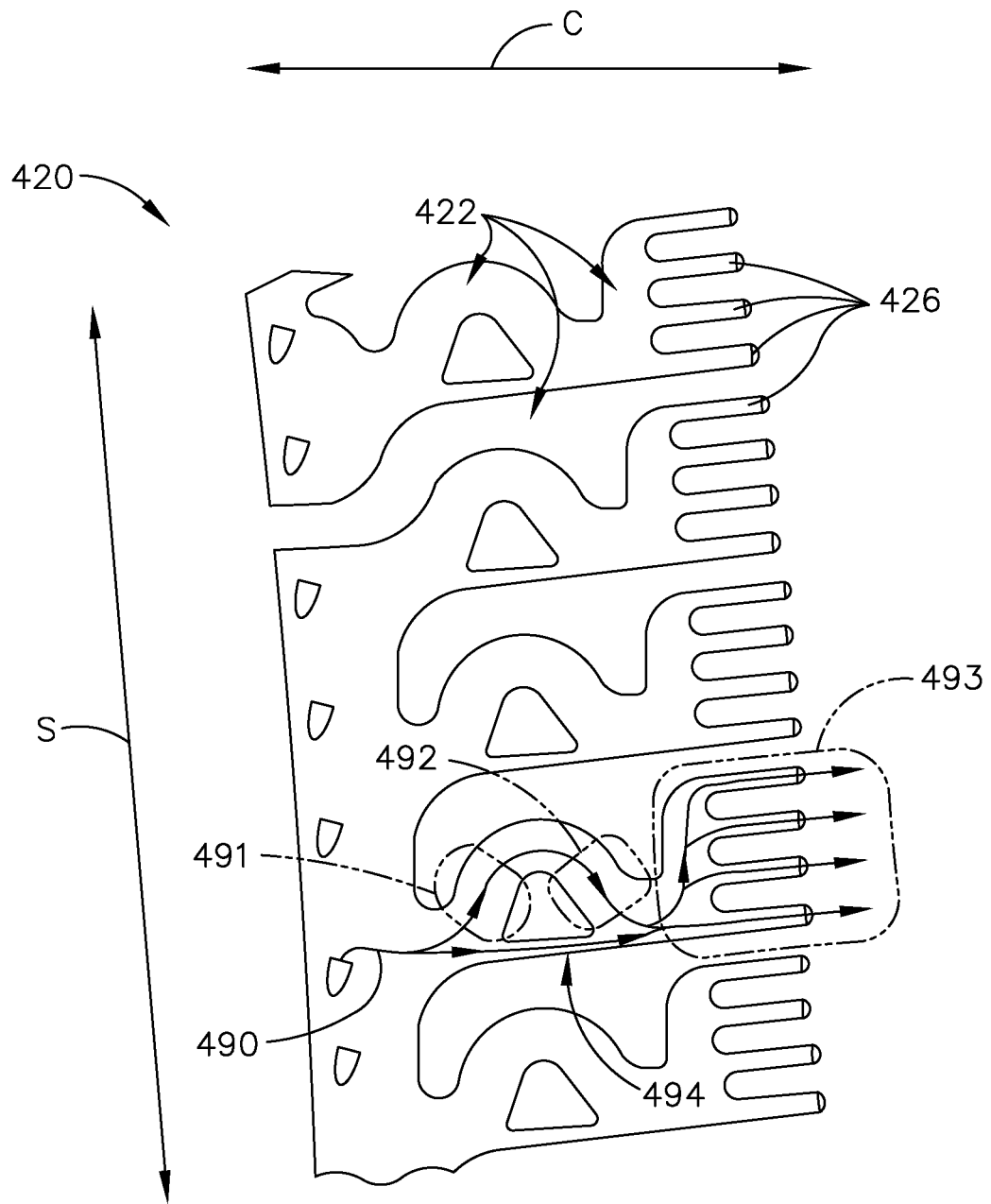
FIG. 11 is a sectional view of another plexus of cooling passages that can be utilized in the airfoil of FIG. 2.

Referring now to FIG. 11, another three-dimensional plexus 420 of cooling passages is illustrated that can be utilized in the airfoil 100. The plexus 420 is similar to the plexus 120, 220, 320; therefore, like parts will be identified with like numerals further increased by 100, with it being understood that the description of the like parts of the plexus 120, 220, 320 applies to the plexus 420, unless otherwise noted.

For clarity, the plexus 420 is shown without the surrounding airfoil. It should be understood that the plexus 420 can be positioned within an interior of the airfoil, such as that shown for the plexus 120 within the airfoil 100 (see FIG. 2). In addition, it should be understood that although illustrated with "flat" passages and regions, the plexus 220 represents three-dimensional open spaces or voids within the airfoil 100. The span-wise and chord-wise directions S, C are illustrated for reference. It should be understood that the plexus 420 can be oriented in any suitable direction within the airfoil 100, including along any combination of the span-wise direction S, chord-wise direction C, or cross-wise direction R.

The plexus 420 of cooling passages 422 can include at least one inlet 424, illustrated as a plurality of inlet holes, wherein cooling air can be supplied to the plexus 420. The plexus 420 also includes a plurality of outlets 426 that can be positioned along a trailing edge of the airfoil.

A cooling passage 422 is shown with an exemplary cooling airflow 490 flowing between the inlet 424 and outlet 426. One difference is the plexus 420 can include an axial serpentine profile. More specifically, the cooling passage 422 can include a first portion 491 wherein the cooling airflow 490 moves in a downstream chord-wise direction as well as moving radially outward in the span-wise direction. The cooling passage 422 also includes a second portion 492 wherein the cooling airflow 490 continues moving in the downstream chord-wise direction while moving radially inward in the span-wise direction. A third portion 493 fluidly coupled to the second portion 491 divides the cooling airflow 490 prior to flowing through multiple outlets 426. In this manner, the first, second, and third portions 491, 492, 493 can at least partially define the axial serpentine profile of the plexus 420.

Optionally, the cooling passage 422 can include a fourth portion 494 providing an additional fluid coupling between the first and second portions 491, 492. Alternately, the fourth portion 494 can provide rigidity or support for the axial-serpentine shaped cooling passage 422 without providing an additional fluid coupling.

Figure 12:
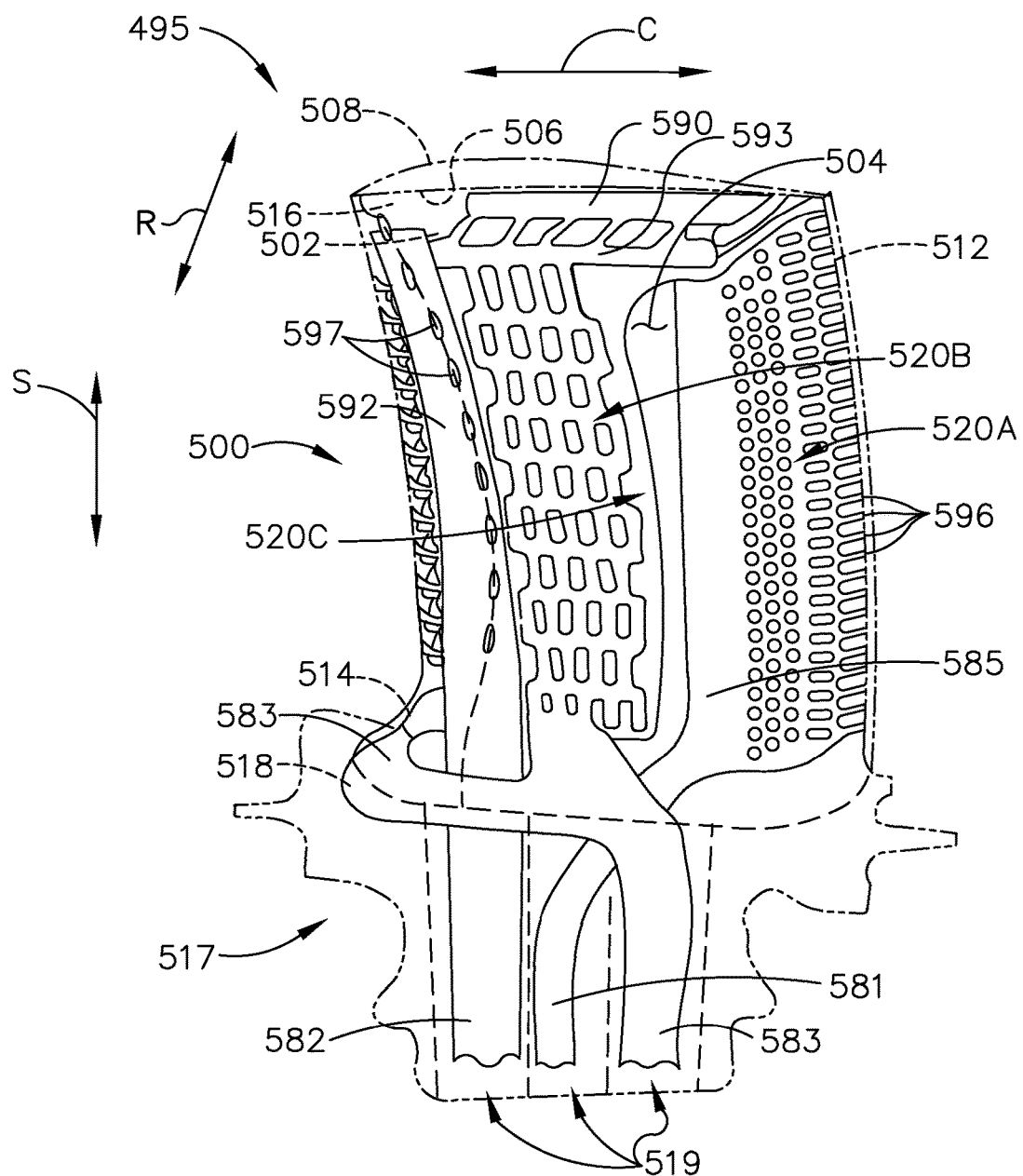
FIG. 12 is a perspective view of another component that can be utilized in the turbine engine of FIG. 1 in the form of another airfoil including at least one plexus of cooling passages according to various aspects described herein.

Turning to FIG. 12, another engine component in the form of an airfoil assembly 495 is shown that can be utilized in the turbine engine 10 of FIG. 1. The airfoil assembly 495 is similar to the airfoil assembly 95; therefore, like parts will be identified with like numerals increased by 400, with it being understood that the description of the like parts of the airfoil assembly 95 applies to the airfoil assembly 495, except where noted.

The airfoil assembly 495 includes an airfoil 500 that can be any airfoil such as a blade or vane in any section of the turbine engine 10, including the compressor section 22 or turbine section 32 as desired.

The airfoil 500 includes an outer wall 502 (shown in phantom line) defining an exterior surface 503 and bounding an interior 504. The outer wall 502 defines a pressure side 506 and suction side 508 with a cross-wise direction R defined therebetween. The outer wall 502 also extends axially between a leading edge 510 and a trailing edge 512 to define a chord-wise direction C, and also extends radially between a root 514 and a tip 516 to define a span-wise direction S. In addition, the airfoil 500 can extend from a dovetail 517 having at least one inlet passage 519 as shown.

The airfoil 500 can include at least one cooling air supply conduit fluidly coupled to at least one passage within the interior 504. In the illustrated example the airfoil 500 includes first, second, and third cooling air supply conduits 581, 582, 583. A trailing edge passage 591 can extend along the trailing edge 512 and fluidly couple to the first supply conduit 581. A leading edge passage 592 can extend along the leading edge 510 and fluidly couple to the second supply conduit 582. A tip passage 593 can extend along the tip 516 of the airfoil 500 and fluidly couple to the third supply conduit 583.

The airfoil can also include a plurality of outlets located in the exterior surface 503. For example, a plurality of trailing edge outlets 596, leading edge outlets 597, and tip outlets 598 can be provided in the exterior surface 503 and be fluidly coupled to the trailing edge passage 591, leading edge passage 592, and tip passage 593, respectively. It should be understood that the supply conduits 581, 582, 583 and passages 591, 592, 593 and outlets 596, 597, 598 are exemplary, and the airfoil 500 can include more or fewer supply conduits or passages than those shown.

At least one three-dimensional plexus can also be included in the airfoil 500. In the illustrated example, a first plexus 520A similar to the plexus 120, 220, 320, 420 is included in the first supply conduit 581 and fluidly coupled to the trailing edge passage 591 and trailing edge outlets 596. A second plexus 520B and a third plexus 520C, both similar to the plexus 120, 220, 320, 420, are included in the third supply conduit 583. The second plexus 520B can be fluidly coupled to the tip passage 593 and tip outlets 598. The third plexus 520C can be fluidly coupled to either or both of the first plexus 520A or tip passage 593. In addition, the first plexus 520A can be positioned adjacent the second plexus 520B in the chord-wise direction C, such as the second plexus 520B being located upstream of the first plexus 520A. For clarity, the third plexus 520C is schematically illustrated in solid outline form. It should be understood that the third plexus 520C also includes fluidly interconnected cooling passages not shown in this view. It will also be understood that other cooling passages, holes, or outlets not shown can nonetheless be provided in the airfoil 500.

In another example, a surface channel 590 can be provided in the exterior surface 503 of the outer wall 502, illustrated adjacent the tip 516 of the airfoil 500. The surface channel 590 can be fluidly coupled to either or both of the second plexus 120B and the tip outlets 598. For example, at least some of the tip outlets 598 can be provided in the surface channel 590. In another example where no tip channel is utilized, the tip outlets 598 can be provided directly in the exterior surface 503.

It is also contemplated that at least one of the cooling air supply conduits can include at least one non-furcated passage 585. For example, the second supply conduit 582 can include a non-furcated passage 585 which is fluidly coupled to the leading edge passage 592. In another example, the first supply conduit 581 can include a non-furcated passage 585 which is fluidly coupled to, and located upstream of, the first plexus 520A.

It is also contemplated that at least one of the cooling air supply conduits can be at least partially radially aligned with at least one three-dimensional plexus. In the illustrated example, the first cooling air supply conduit 581 is at least partially radially aligned with the first plexus 520A, and the third cooling air supply conduit 583 is radially aligned with the second plexus 520B and third plexus 520C.

Figure 13:
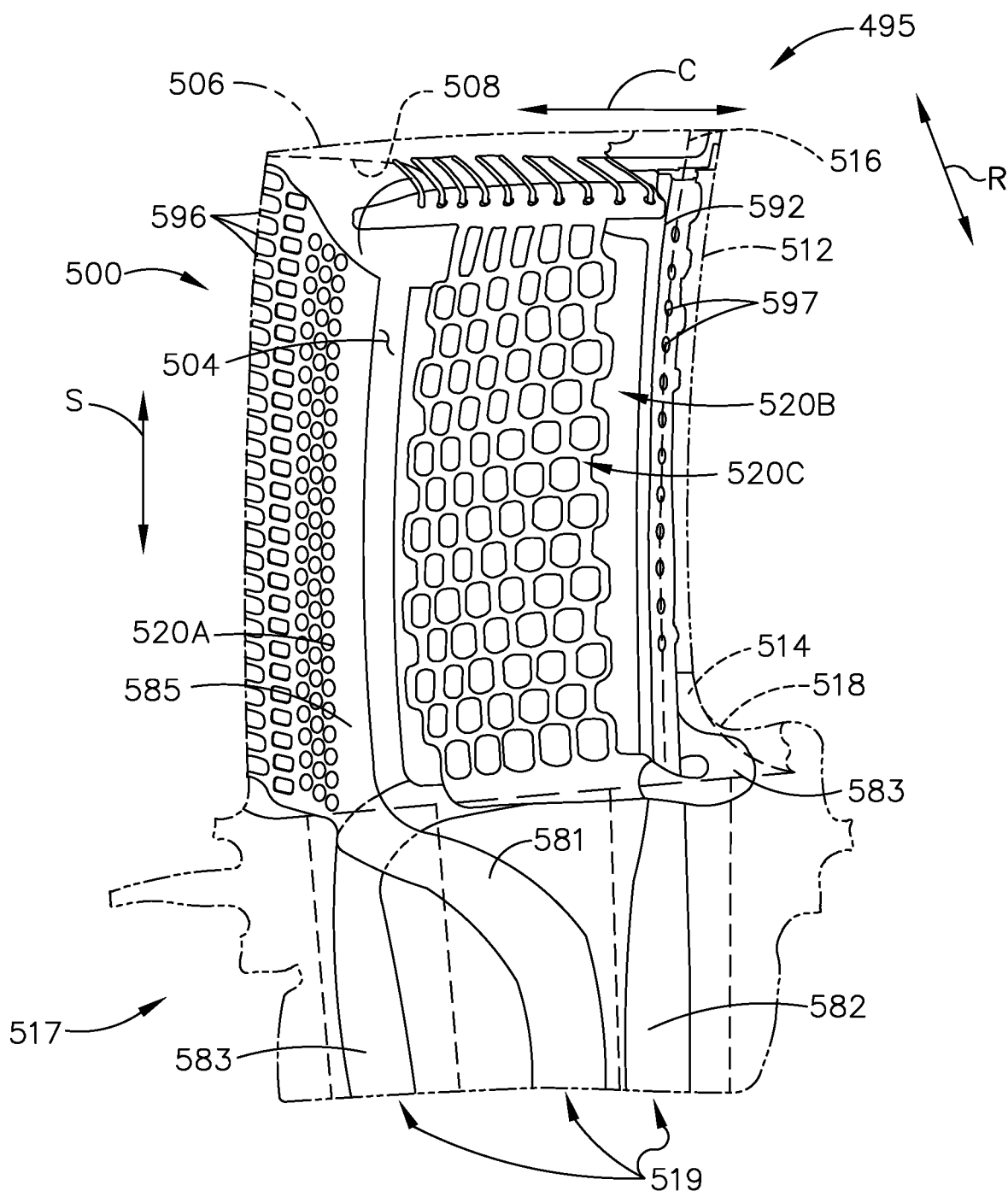
FIG. 13 is another perspective view of the airfoil of FIG. 12.

FIG. 13 illustrates the airfoil 500 facing the pressure side 506. In this view, the second plexus 520B is schematically illustrated in solid outline form, and it should be understood that the second plexus 520B can include fluidly interconnected cooling passages as shown in FIG. 13. It is further contemplated that the second plexus 520B and third plexus 520C can be located adjacent one another in the cross-wise direction R, with the second plexus positioned adjacent the pressure side 506 and the third plexus positioned adjacent the suction side 508. In addition, the second plexus 520B and third plexus 520C can be fluidly coupled and optionally supplied by a common inlet passage within the dovetail 517. Additional tip outlets 598 can be fluidly coupled to the tip passage 593; in the illustrated example, the surface channel 590 can be provided on the pressure side 506 (FIG. 12) while the tip outlets 598 can be provided directly on the exterior surface on the suction side 508 (FIG. 13).

In operation, cooling air supplied from the dovetail 517 can flow radially outward (e.g. along the span-wise direction S) through the first supply conduit 581, second supply conduit 582, and third supply conduit 583. Cooling air can flow in the span-wise direction S, chord-wise direction C, cross-wise direction R, or any combination thereof, while flowing through at least one three-dimensional plexus within the airfoil 500 before being emitted through at least one outlet on the leading edge 510, trailing edge 512, tip 516 or elsewhere on the exterior surface 503. The cooling air can flow through at least one non-furcated passage 585 prior to flowing through a three-dimensional plexus as described above.

In still another example (not shown), multiple plexuses can be provided within the airfoil such that the cooling passages of a first plexus can be interwoven through cooling passages of a second plexus. The first plexus can optionally be fluidly coupled to the second plexus, or the first and second plexus can be supplied with independent sources of cooling air. For example, the first plexus can include a planar set of cooling passages in the span-wise direction and the second plexus can include a planar set of cooling passages in the chord-wise direction, where cooling passages of the first plexus are directed around cooling passages of the second plexus without being fluidly coupled to the second plexus.

In another non-limiting example (not shown), at least one plexus can be directly fluidly coupled to outlets in the exterior surface, such as tip outlets, without intervening ejection holes. In such a case, at least one plexus can extend fully to the tip of the airfoil and fluidly couple to the outlets. The lattice portion can also be directly fluidly coupled to other outlets located on the pressure side or suction side of the airfoil, including without intervening ejection holes; including by way of the elongated ejection holes or by directly fluidly coupling to the outlets without such ejection holes.

In yet another non-limiting example (not shown), the plexus can further include multiple discrete groups of cooling passages each fluidly supplied by a separate cooling conduit. Each of the multiple discrete groups can include any or all of the impingement zone, lattice portion, or elongated ejection holes. The multiple discrete groups can be fluidly coupled, for example by a single connecting fluid passage, or they can be separated within the airfoil interior. In addition, the multiple discrete groups can form multiple impingement zones arranged radially within the airfoil, such that cooling air supplied from the cooling conduit can impinge a first zone, impinge a second zone, impinge a third zone, and so on, until exiting via a cooling hole outlet.

Aspects provide for a method of cooling a turbine engine airfoil, including supplying a cooling fluid through a three-dimensional plexus, such as the plexus 120, 220, 320, 420 of fluidly interconnected cooling passages within the airfoil, and emitting the cooling fluid through at least one outlet. The outlet can be located on any or all of the leading edge, trailing edge, tip, or surface channel as described above. Optionally, the method can include dividing the cooling fluid at an intersection, such as the first intersection 135 of the first planar set 131 of cooling passages extending in the first direction 141 and the second planar set 132 of cooling passages extending in the second direction 142. Optionally, the method can include recombining the cooling fluid from the first and second planar sets 131, 132 at a second intersection 145. The first direction 141 can be in the cross-wise direction R between the pressure side 106 and the suction side 108 of the airfoil 100, and the second direction 142 can be along the span-wise direction S or the chord-wise direction C. It is contemplated that any of first, second, and third directions can be in any of the span-wise direction S, the chord-wise direction C, the cross-wise direction R, or any combination of the above. The method can further include impinging the cooling fluid on the impingement zone 161 within a cooling passage 122 of the three-dimensional plexus 120. In addition, emitting the cooling fluid can further include emitting through multiple outlets, such as the outlets 126 at the trailing edge 112 disposed between multiple concave portions 170 in one of the pressure or suction sides 106, 108.

The described structures, such as the various plexuses, provide for a method of cooling an airfoil in a turbine engine, including supplying a cooling fluid through a cooling conduit within an interior of the airfoil. The method also includes flowing the cooling fluid to an impingement chamber located within the cooling conduit, impinging the cooling fluid on a pin located within the impingement chamber, and flowing the cooling fluid from the impingement chamber to at least one outlet passage to cool the airfoil. The cooling fluid can flow to a rear portion of the impingement chamber behind and spaced from the pin as described above, and the cooling fluid can then flow from the impingement chamber to the at least one outlet passage. Optionally, the impingement chamber can be located within a plexus of fluidly interconnected cooling passages as described above.

The described structures and methods provide several benefits, including that the ability to split and tailor the three-dimensional plexus of cooling passages can provides specified cooling to multiple airfoil locations as desired. The three-dimensional structure provides for closely following multiple contours within the airfoil, enabling weight reductions, manufacturability improvements, and improved cooling to tailored locations. Tailored geometries such as serpentine or fractal portions, or combinations thereof, within the three-dimensional plexus also provide for localized increase in temperature capability, where stresses or temperature fields lead to higher cooling needs at specific locations on or within the airfoil. Such tailoring can be accomplished by varying a passage size, length, or cross-sectional width, or by branching off portions of the plexus at an intersection to redirect cooling air to needed portions of the airfoil. Improving the cooling performance results in less dedicated cooling flow from the engine, improving engine performance and efficiency. In addition, tailored cooling can reduce component stress and improve the working lifetime of a component, resulting in better engine durability.

One benefit of the fractal or furcated geometry is that the use of larger passages transitioning to smaller passages can accomplish the same or improved cooling performance with less supplied air. In addition, larger or upstream passages being radially or axially offset from downstream passages, such as in a serpentine geometric profile, can provide for increased working of the cooling air which can further improve cooling performance. Such fractal, furcated, lattice, or serpentine geometries can spread the cooling air over a greater region of the airfoil or expose a greater surface area of the airfoil interior to the cooling air during operation, which increasing high-temperature cooling performance compared to traditional cooling structures.

It can also be appreciated that the use of impingement zones, including the positioning of a pin in an impingement chamber, can provide for increased surface area for cooling of the airfoil. Airflow modifiers can provide for mixing, redirecting, working, or turbulating of the cooling air within the airfoil, including within the three-dimensional plexus, which can improve cooling performance compared to traditional methods of cooling.

It can be further appreciated that the use of concave portions at the trailing edge outlets, in combination with the plexus of cooling passages and airflow modifiers, can direct, tailor, and efficiently utilize the cooling air supplied as cooling airflows through and out of the airfoil 100. The ability to tailor or customize an exit airflow direction through the outlets via the concave portions can improve producibility in a variety of manufacturing methods, including casting or additive manufacturing. The concave portions can effectively provide a thinner trailing edge compared to traditional airfoils, which improves bore cooling performance and reduces the weight of the airfoil, thereby improving durability and engine efficiency. It can also be appreciated that the use of concave portions or other indented surface features can improve or tailor flow streams around the airfoil, or enhance mixing and promote turbulence where desired.

It should be understood that application of the disclosed design is not limited to turbine engines with fan and booster sections, but is applicable to turbojets and turboshaft engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, comprising:
an outer wall defining an exterior surface bounding an interior and defining a pressure side and a suction side extending between a leading edge and a trailing edge to define a chord-wise direction and extending between a root and a tip to define a span-wise direction;
outlets on the exterior surface; and
a cooling air supply conduit within the interior and having a supply passage and a three-dimensional plexus of fluidly interconnected cooling passages that are fluidly connected to the outlets, wherein at least a portion of the three-dimensional plexus is spaced from the outer wall.

2. The airfoil of claim 1, wherein the outlets are located at the tip for at least one of the pressure side or the suction side.

3. The airfoil of claim 1, further comprising a supply cavity within the interior and fluidly coupled to the three-dimensional plexus.

4. The airfoil of claim 3, wherein the three-dimensional plexus is located between the supply cavity and the outlets.

5. The airfoil of claim 3, wherein the outlets are located on the trailing edge.

6. The airfoil of claim 3, wherein the three-dimensional plexus is spaced from one of the pressure side, the suction side, or the tip, and wherein the outlets are located at the tip along one of the pressure side or the suction side.

7. The airfoil of claim 3, wherein the at least a portion of the three-dimensional plexus defines a first spacing distance from the suction side, and wherein the supply cavity defines a second spacing distance from the suction side larger than the first spacing distance.

8. The airfoil of claim 7, wherein the outlets are located on the suction side.

9. The airfoil of claim 3, wherein the three-dimensional plexus is spaced from the suction side and fluidly coupled to the supply cavity, and wherein the outlets are located along the trailing edge.

10. The airfoil of claim 1, wherein the three-dimensional plexus further comprises at least one planar set of cooling passages.

11. A cooled component for a turbine engine, comprising:
an outer wall defining an exterior surface bounding an interior;
outlets on the exterior surface; and
a cooling air supply conduit having a supply passage and a three-dimensional plexus of fluidly interconnected cooling passages which are fluidly connected to the outlets, with the supply passage at least partially radially aligned with the three-dimensional plexus.

12. The cooled component of claim 11, further comprising a channel in the exterior surface and at least some of the outlets are located in the channel.

13. The cooled component of claim 11, further comprising a second three-dimensional plexus of fluidly interconnected cooling passage fluidly coupled to the three-dimensional plexus.

14. The cooled component of claim 13, wherein the second three-dimensional plexus is upstream of the three-dimensional plexus.

15. The cooled component of claim 11, further comprising an in-wall cooling passage extending through the interior of the outer wall and fluidly coupled to the three-dimensional plexus.

16. A cooled component, comprising:
an outer wall defining an exterior surface bounding an interior; and
a three-dimensional plexus of fluidly interconnected cooling passages located within the interior and having at least one planar set of cooling passages.

17. The cooled component of claim 16, further comprising an airfoil assembly in a turbine engine, wherein the outer wall further comprises an airfoil outer wall having a set of outlets.

18. The cooled component of claim 17, wherein the airfoil assembly further comprises a platform coupled to the airfoil outer wall, and wherein the set of outlets are located on the platform.

19. The cooled component of claim 16, wherein the at least one planar set of cooling passages is spaced from the outer wall.

20. The cooled component of claim 19, further comprising a cooling cavity located within the interior and fluidly coupled to the at least one planar set of cooling passages.

* * * * *